April 6, 1965  J. B. NEZZLE  3,176,784
ICE CUTTING APPARATUS
Filed April 10, 1963
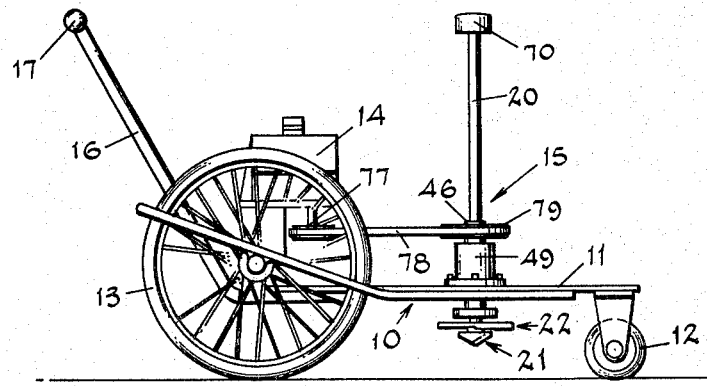
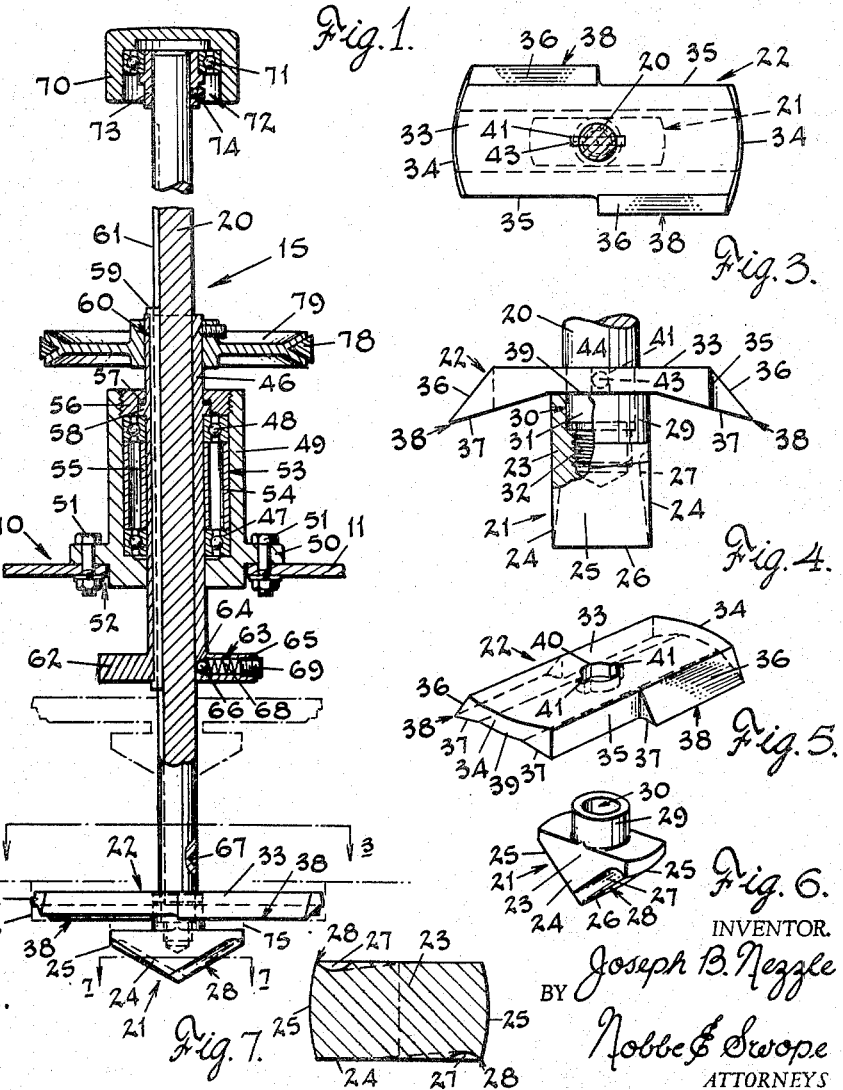
INVENTOR.
Joseph B. Nezzle
BY Nobbe & Swope
ATTORNEYS

United States Patent Office 3,176,784
Patented Apr. 6, 1965

3,176,784
ICE CUTTING APPARATUS
Joseph B. Nezzie, 2343 Marengo Drive, Toledo, Ohio
Filed Apr. 10, 1963, Ser. No. 271,924
2 Claims. (Cl. 175—18)

The present invention relates broadly to apparatus for cutting holes in a relatively hard surface, and more particularly to apparatus for cutting holes in ice.

A general object of this invention is to provide a novel apparatus of relatively simple and inexpensive construction for cutting holes of sufficient size in ice in preparation for ice fishing.

Another object of the invention is to provide a novel and improved rotary-type cutting apparatus of the above character including a rotary cutting blade for forming a hole of the desired size through the ice, and a pilot cutter for initiating the cutting of the hole and for stabilizing the cutting action of the cutting blade.

A further object of the invention is to provide a novel and improved rotary cutting apparatus of the above character for cutting holes in ice including a shaft on which the cutting blade and the pilot cutter are mounted, in combination with portable means for supporting the shaft for simultaneous rotary and axial movement during the cutting operation.

Other objects and advantages of the invention will become more apparent during the course of the following description when read in connection with the accompanying drawings.

In the drawings, wherein like numerals are employed to designate like parts throughout the same:

FIG. 1 is a side elevation of an ice cutting apparatus constructed in accordance with the present invention;

FIG. 2 is a view, partially in section, of the cutting assembly;

FIG. 3 is a horizontal view of the cutting assembly taken on line 3—3 of FIG. 2;

FIG. 4 is an enlarged end view of the cutting assembly;

FIG. 5 is a perspective view of the main cutting blade of the cutting assembly;

FIG. 6 is a perspective view of the pilot cutter of the cutting assembly; and

FIG. 7 is a detail horizontal section of the pilot cutter taken on line 7—7 of FIG. 2.

Referring now to the drawings and particularly to FIG. 1, the ice cutting or drilling apparatus of this invention comprises essentially a supporting framework 10 including a horizontally disposed platform 11 movably supported by caster-type wheels 12 at its forward end and by wheels 13 at its rear end. A suitable source of power, such as a conventional gasoline motor 14, is mounted on the platform 11 and is adapted to operate a cutting or drilling assembly generally designated by the numeral 15 mounted on the platform 11. The framework 10 is bodily movable by means of a handle 16 equipped with hand grips 17 and secured to the rear end of the platform 11. It will be readily appreciated from the following description that the cutting assembly can also be easily mounted on any type of conveyance, such as a sled, ski-sled or the like.

Generally stated, the cutting assembly 15 comprises a vertically disposed shaft 20 to the lower end of which is secured a pilot cutter or boring head 21 and a main cutting blade 22 which constitute the actual cutting or drilling elements of the cutting assembly. As illustrated in FIGS. 2, 4, 6 and 7, the cutter head 21 comprises a wedge shaped metal body 23 having triangular shaped opposite side surfaces 24 and arcuately curved end surfaces 25 which converge downwardly to form a sharp edge 26. The side surfaces 24 of the body 23 are provided adjacent to and parallel with the inclined end surfaces 25 with undercut grooves 27 which result in the formation of inclined cutting edges 28 at the diagonally disposed corners of the body. Formed on the top surface of the body 23 is an integral boss 29 provided with a socket 30 for receiving the lower end portion 31 of the shaft 20. Beneath the socket 30 the body 23 may be internally threaded, as at 32, to receive the extreme threaded end of the shaft 20.

The cutting blade 22, as viewed in FIGS. 3, 4 and 5, comprises a substantially rectangular metal plate 33 having arcuately finished end surfaces 34 which flare downwardly and outwardly from the upper surface of the plate. The plate 33 is provided along each side 35 thereof with an angular surface 36 which merges with the undersurface 37 of the plate to provide an elongated cutting edge 38. As will be seen in FIG. 3, the cutting edge extends inwardly from one end of the plate along approximately one-half its length, with the cutting edges at opposite sides of the plate being diagonally disposed with respect to one another. The sides 35 of the plate 33 beyond the respective cutting edges 38 are located inwardly of said cutting edges to provide relief or clearance areas to facilitate removal of the ice cut away by the cutting action of the cutting blade during the cutting operation. In end elevation (FIG. 4), the cutting blade has a substantially flat central web portion 39 between the downwardly angled surfaces 37. The web portion 39 is provided with an opening 40 to receive the reduced end portion 31 of the shaft 20 and is rigidly secured thereto. For this purpose, the shaft portion 31 is cross-drilled to receive a pin 43, the opposite ends of which are received in the diametrically opposed notches 41 in the cutting blade when said blade is mounted on the shaft, as in FIGS. 2, 3 and 4. As viewed in FIG. 4, the end portion 31 of the shaft is of reduced diameter to form a shoulder 44 against which the cutting blade 22 abuts.

The supporting shaft 20 is mounted in such a way that it can be moved axially and simultaneously rotated during the cutting of a hole. For these purposes, the shaft is received in a sleeve 46 journaled in bearings 47 and 48 that are contained within a tubular housing 49. The housing is formed at its lower end with an annular flange 50 by which it is secured, as by bolts 51, on the platform 11 and in alignment with an opening 52 therein. The housing is also provided with a bore 53 for receiving the bearings 47 and 48 which are spaced therein by tubular spacers 54 and 55 and retained by a closure plate 56 threaded into the open upper end of the housing. The inner surface of closure plate 56 is recessed to receive a bearing washer 57 and a flange 58 integral with the sleeve 46 within the recess. When the closure plate is positioned within the housing 49, as in FIG. 2, the periphery of the inner surface engages the outer race of bearing 48 to press the same downwardly against the spacer 54 which, in turn, operates to fixedly seat the bearing 47 on the end wall of the bore 53. Also, the sleeve flange 58 and washer 57 are urged against the journal support provided by the inner races of bearings 47 and 48 and the spacer 55 therebetween. The drive sleeve 46 is thus supported for satisfactory rotation relative to the housing 49 and is retained against endwise movement by the flange 58 between the bearing 48 and the plate 56.

A drive connection between the shaft 20 and sleeve 46 is effected by an elongated key or spline 59 that is received in a longitudinally extending groove 60 provided in the shaft 20 and a complementary groove 61 in the inner surface of the sleeve. At its lower end, the sleeve 46 is fitted with a collar 62 that can be fixed thereto, as by welding, after the sleeve has been bodily inserted through the housing 49 and bearing members therein. When suitably attached to the sleeve, the collar is drilled to form a chamber 63 with a conical inner end 64 and an outer internally threaded end portion 65. A ball 66 located in the chamber 63 is employed to provide a locking connection between the shaft 20 and sleeve 46. For this purpose, the shaft is formed with a conical recess or socket 67 while the ball 66 is pressed by spring 68, retained in the chamber by a threaded plug 69, toward the open inner end of said chamber so as to be movable therethrough. Upon alignment of the socket 67 with the chamber 63, the ball snaps into the socket 67 thereby temporarily securing or locking the shaft 20 from reciprocal or sliding movement relative to the sleeve 46.

The shaft 20 is adapted to be manually controlled in its reciprocal movements by a hand knob 70 mounted by a bearing 71 on the upper end of the shaft. As herein disclosed, the knob 70 is formed with an inner chamber 72 having a wall surface finished to receive the outer race or case of the bearing 71 in so-called "press-fit" association. The inner race of said bearing is likewise press-fit onto one end of a flanged sleeve 73 that can be secured on the end of shaft 20 by a set screw 74. This affords a freely rotatable connection between the knob and the shaft to the end that while the shaft is driven at a relatively high rate of speed, the knob can be manually gripped to simultaneously move the shaft axially relative to the drive sleeve 46.

An important advantage of the cutting apparatus herein provided resides in the fact that the cutter head 21, as it is moved downwardly onto the ice surface, initiates the cutting action by forming a counter-sink or conically-shaped entry or pilot cavity in the ice and serves to stabilize the subsequent cutting action of the cutting blade 22 by maintaining the shaft 20 in a substantially vibrationless vertical position of operation. This cavity is indicated by the broken line 75 in FIG. 2 and is subsequently enlarged to a circular opening or hole of substantially larger size, as indicated by the numeral 76, by the cutting edges of the cutting blade.

It has been found that the combined action of the cutter head and cutting blade results in a clean and rapid cutting of the hole and reduces the manual effort involved to force the shaft and cutting assembly downwardly and thereby maintain first the cutter head and then the cutting blade in firm, steady contact with the ice during cutting. This results in penetration of the ice layer with a minimum amount of effort and upon completion of the hole cutting operation, the pressure of the water therebeneath causes an upper thrusting action to clear the hole of ice particles. By lifting the knob 70, the shaft can be raised until the locking connection, afforded by the ball 66 and socket 67, secures the shaft in its inoperative position.

In use, the drive sleeve 46 is operatively connected to drive sheave 77 of the motor 14 by a belt 78 and sheave 79 keyed to the upper end of said sleeve. Since it is herein contemplated to employ a conventional motor of relatively low power, such as of 2½ horsepower, the ratio between the sheaves 77 and 79 can be easily determined to provide an adequate amount of operative power for the cutting assembly. When the shaft 20 is raised to its uppermost position, as in FIG. 1, the cutting assembly is located beneath the platform 11 or, as shown in broken lines in FIG. 2, above the surface on which the ice drilling apparatus is supported. Upon manually gripping the knob 70, the shaft can be moved downwardly to force the ball 66 outwardly of the socket 67 to release the shaft for vertical movement relative to the sleeve 46 with which it is rotatably driven through the key or spline 59.

It is to be understood that the form of the invention herewith shown and described is to be taken as a preferred embodiment of the same, and that various changes in the shape, size and arrangement of parts may be resorted to without departing from the spirit of the invention.

I claim:
1. An apparatus for use in cutting holes in ice, comprising a vertical shaft, means for rotating said shaft, a cutting blade and a cutter head carried at the lower end of said shaft, with said cutter head being located beneath said cutting blade in position to initiate the cutting action and being of such size in relation to the cutting blade that the initial opening formed by the cutter head is smaller than the hole formed by the cutting blade, said cutting blade comprising a substantially rectangular solid plate having a flat upper surface and a longitudinally disposed flat medial lower surface portion substantially parallel with said flat upper surface, said flat medial lower surface portion terminating in downwardly and outwardly inclined side marginal surfaces, said rectangular plate having end surfaces that flare downwardly and outwardly from said flat upper surface, the inclined marginal side surfaces extending from the flat medial lower surface portion having a portion of increased width extending from substantially the transverse axis of the rectangular plate to the adjacent end surfaces and diagonally disposed relative to one another, said flat upper surface terminating in downwardly and outwardly inclined side surface portions from substantially the transverse axis of the plate to the adjacent end surfaces and in diagonally disposed relation to one another, the inclined lower marginal side surfaces of increased width and said inclined upper surface side portions being convergently disposed with respect to one another to form elongated cutting edges, the said plate being also provided with elongated flat surface side portions extending from the cutting edges to the opposite end surfaces of the plate and being disposed inwardly of said cutting edges to provide clearance areas to facilitate removal of the ice cut away by said cutting edges, said shaft having a lower reduced end portion terminating in a threaded portion passing through an opening in the center of said plate, means locking said plate on the reduced end portion of the shaft for rotation therewith, and said cutter head being formed with means threadedly received on the threaded end portion of the shaft to secure said cutting blade and cutter head on the said shaft.

2. An apparatus for use in cutting holes in ice as defined in claim 1, in which the cutter head comprises a wedge-shaped body portion having an annular boss as the upper end thereof, said boss being formed with a socket to receive the reduced end portion of the shaft and internally threaded beneath said socket to receive the threaded end of said shaft, the side surfaces of the body portion being substantially flat and parallel with one another, the end surfaces of the body portion being formed in inwardly and downwardly convergent relation to one another and the diagonally disposed corners formed by the juncture of the side surfaces and the end surfaces having undercut grooves therein to form inclined cutting edges to form the initial opening of the hole to be cut in the ice.

References Cited by the Examiner
UNITED STATES PATENTS

| | | | |
|---|---|---|---|
| 170,445 | 11/75 | Montgomery | 175—385 |
| 1,064,825 | 6/13 | Gibson | 175—385 |
| 2,709,572 | 5/55 | Ageborn | 175—18 |
| 2,744,726 | 5/56 | Comeaux | 175—195 X |
| 2,860,855 | 11/58 | Vincent | 175—18 |
| 2,933,290 | 4/60 | Ryder | 175—394 X |
| 3,093,199 | 6/63 | Premo | 175—18 |

CHARLES E. O'CONNELL, *Primary Examiner.*